US012086776B2

(12) United States Patent
Kumar et al.

(10) Patent No.: US 12,086,776 B2
(45) Date of Patent: *Sep. 10, 2024

(54) TRANSPORT VEHICLE ACCESS SHARING WITH VARIOUS OCCUPANTS

(71) Applicant: TOYOTA MOTOR NORTH AMERICA, INC., Plano, TX (US)

(72) Inventors: Manish Kumar, Frisco, TX (US); James H. Kikuma, Plano, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,561

(22) Filed: Jul. 19, 2022

(65) Prior Publication Data
US 2022/0366391 A1  Nov. 17, 2022

Related U.S. Application Data

(63) Continuation of application No. 16/389,333, filed on Apr. 19, 2019, now Pat. No. 11,392,915.

(51) Int. Cl.
| G06Q 20/14 | (2012.01) |
| G06F 9/54 | (2006.01) |
| G06Q 10/08 | (2024.01) |
| G06Q 20/20 | (2012.01) |
| G06Q 20/32 | (2012.01) |
| G06Q 20/40 | (2012.01) |
| G06Q 30/018 | (2023.01) |
| G06Q 30/0645 | (2023.01) |
| G07B 15/06 | (2011.01) |

(52) U.S. Cl.
CPC .......... *G06Q 20/145* (2013.01); *G06F 9/542* (2013.01); *G06Q 10/08* (2013.01); *G06Q 20/204* (2013.01); *G06Q 20/322* (2013.01); *G06Q 20/40* (2013.01); *G06Q 30/018* (2013.01); *G06Q 30/0645* (2013.01); *G07B 15/063* (2013.01)

(58) Field of Classification Search
CPC ...... G06Q 20/145; G06Q 10/08; G06Q 20/40; G06Q 30/0645; G06F 9/542
See application file for complete search history.

(56) References Cited

U.S. PATENT DOCUMENTS

| 8,744,963 B1 | 6/2014 | Yadav-Ranjan |
| 10,022,614 B1 | 7/2018 | Tran et al. |
| 10,452,776 B2 | 10/2019 | Anderson et al. |
| 10,521,780 B1 | 12/2019 | Hopkins, III et al. |
| 10,832,335 B1 | 11/2020 | Floyd |

(Continued)

FOREIGN PATENT DOCUMENTS

| WO | 2017162904 A1 | 9/2017 |
| WO | 2020036731 A1 | 2/2020 |

OTHER PUBLICATIONS

Chau, Sid Chi-Kin, Shuning Shen, and Yue Zhou. "Decentralized ride-sharing and vehicle-pooling based on fair cost-sharing mechanisms." IEEE Transactions on Intelligent Transportation Systems 23.3 (2020): 1936-1946. (Year: 2020).*

(Continued)

*Primary Examiner* — A. Hunter Wilder

(57) ABSTRACT

An example operation may include determining a fractional responsibility of an event, a sub-event and/or an occupant associated with a transport.

20 Claims, 14 Drawing Sheets

(56) References Cited

U.S. PATENT DOCUMENTS

| | | | |
|---|---|---|---|
| 11,615,409 B1 | 3/2023 | Rehm | |
| 2007/0216521 A1 | 9/2007 | Guensler et al. | |
| 2008/0091342 A1 | 4/2008 | Assael | |
| 2010/0007523 A1 | 1/2010 | Hatav | |
| 2011/0054956 A1 | 3/2011 | Meyer et al. | |
| 2012/0290652 A1 | 11/2012 | Boskovic | |
| 2013/0203400 A1 | 8/2013 | Ricci | |
| 2015/0012341 A1 | 1/2015 | Amin | |
| 2016/0048777 A1* | 2/2016 | Kitagawa | G06Q 10/025 705/6 |
| 2016/0125662 A1 | 5/2016 | Fujita et al. | |
| 2016/0364823 A1 | 12/2016 | Cao | |
| 2017/0357916 A1* | 12/2017 | Shelby | G06Q 10/02 |
| 2017/0365030 A1 | 12/2017 | Shoham et al. | |
| 2018/0060827 A1 | 3/2018 | Abbas et al. | |
| 2018/0211541 A1 | 7/2018 | Rakah et al. | |
| 2018/0342036 A1 | 11/2018 | Zachary | |
| 2019/0043121 A1 | 2/2019 | Barnes et al. | |
| 2019/0102850 A1* | 4/2019 | Wheeler | G06Q 20/405 |
| 2019/0164150 A1 | 5/2019 | Lee et al. | |
| 2019/0180236 A1 | 6/2019 | Greenberger et al. | |
| 2019/0180354 A1 | 6/2019 | Greenberger et al. | |
| 2019/0197430 A1* | 6/2019 | Arditi | G16H 50/20 |
| 2019/0213513 A1 | 7/2019 | DeLuca et al. | |
| 2019/0265059 A1 | 8/2019 | Warnick et al. | |
| 2020/0005559 A1 | 1/2020 | Grunbok et al. | |
| 2020/0134592 A1 | 4/2020 | Rao et al. | |
| 2020/0156652 A1* | 5/2020 | Abundis Vargas | G07C 5/0808 |
| 2020/0334652 A1 | 10/2020 | Kumar et al. | |
| 2020/0380624 A1 | 12/2020 | Turgman et al. | |
| 2021/0365870 A1 | 11/2021 | DaCosta et al. | |

OTHER PUBLICATIONS

The foreign reference and NPLs are not provided herewith as they can be found in the U.S. Appl. No. 16/389,333, filed Apr. 19, 2019 now U.S. Pat. No. 11,392,915.

Anonymous, "How tolls work for drivers",https://help.lyft.com/hc/en-us/articles/115013081068-How-tolls-work-for-drivers-, 2018 Lyft Inc.

Baza, Mohamed, et al. "A light blockchain-powered privacy-preserving organization scheme for ride sharing services." 2020 IEEE 91st Vehicular Technology Conference (VTC2020—Spring). IEEE, 2020. (Year: 2020).

Baza, Mohamed, et al. "B-ride: Ride sharing with privacy-preservation, trust and fair payment atop public blockchain." IEEE Transactions on Network Science and Engineering 8.2 (2019): 1214-1229. (Year: 2019).

Final Office Action issued in the Parent U.S. Appl. No. 16/389,333, mailed on Nov. 30, 2021.

Non-Final Office Action issued in the Parent U.S. Appl. No. 16/389,333, mailed on Jul. 6, 2021.

Notice of Allowance issued in the Parent U.S. Appl. No. 16/389,333, mailed on Mar. 22, 2022.

Wang, Di, and Xiaohong Zhang. "Secure ride-sharing services based on a consortium blockchain." IEEE Internet of Things Journal 8.4 (2020): 2976-2991. (Year: 2020).

White, "Ride Sharing is Convenient. But What Happens If There's an Accident?", https://www.inc.com/john-white/ride-sharing-is-convenient-but-what-happens-if-there-is-an-accident.html, 2018.

Yuan, Yong, and Fei-Yue Wang. "Towards blockchain-based intelligent transportation systems." 2016 IEEE 19th International conference on intelligent transportation systems (ITSC). IEEE, 2016. (Year: 2016).

Advisory Action issued in the Parent U.S. Appl. No. 16/389,333, mailed on Feb. 16, 2022.

The Foreign Reference and NPLs are not provided as they can be found in the parent U.S. Appl. No. 16/389,333, filed Apr. 19, 2019.

P. Pal and S. Ruj, "BlockV: A Blockchain Enabled Peer-Peer Ride Sharing Service," 2019 IEEE International Conference on Blockchain (Blockchain), Atlanta, GA, USA, 2019, pp. 463-468. (Year: 2019).

* cited by examiner

550

600

TRANSPORT VEHICLE ACCESS SHARING WITH VARIOUS OCCUPANTS

CROSS-REFERENCE TO RELATED APPLICATIONS

This application is a continuation of U.S. patent application Ser. No. 16/389,333, filed on Apr. 19, 2019, now U.S. Pat. No. 11,392,915, issued on Jul. 19, 2022, the entire disclosure of which is incorporated by reference herein.

FIELD

This application generally relates to transport vehicle access sharing, and more particularly, to transport vehicle access sharing with various occupants.

BACKGROUND

Vehicles or transports, such as cars, motorcycles, trucks, planes, trains, scooters, etc., are being utilized by various occupants on a short-term basis. For example, a single vehicle may be operated by an operator or operated autonomously and controlled by a central control station at a remote location. The vehicle may be rented via user devices for one or more related or unrelated users/occupants. For example, ridesharing and other group related functions are being used more commonly to consolidate the travel paths taken by the vehicles so that more than one user can access the vehicle at any given time.

Record keeping for such multi-user events can be burdensome especially when certain users receive greater benefits than others, such as longer use of the transport, vehicle amenities which others may not have had the privilege of accessing, prioritized pickup and drop-off events, etc. Any such transport-related event may occur on a regular basis and may require a detailed form of record keeping ensuring costs and other responsibilities are delegated to the proper user/occupant.

SUMMARY

One example embodiment may provide a method comprising one or more of identifying a responsibility value based on a transport event, determining a plurality of occupants are participating in the transport event, determining one or more sub-events which occur during the transport event, determining fractional responsibility values to assign to the plurality of occupants, wherein the fractional responsibility values collectively comprise the responsibility value, and are based on the transport event and the one or more sub-events, and assigning the determined fractional responsibility values to the plurality of occupants.

Another example embodiment may provide a system comprising a transport and a server configured to perform one or more of identify a responsibility value based on a transport event of the transport, determine a plurality of occupants are participants in the transport event, determine one or more sub-events which occur in conjunction with the transport event, determine fractional responsibility values to assign to the plurality of occupants, wherein the fractional responsibility values collectively comprise the responsibility value, and are based on the transport event and the one or more sub-events, and assign the determined fractional responsibility values to the plurality of occupants.

A further example embodiment may provide a non-transitory computer readable medium comprising instructions, that when read by a processor, cause the processor to perform one or more of identifying a responsibility value based on a transport event, determining a plurality of occupants are participating in the transport event, determining one or more sub-events which occur during the transport event, determining fractional responsibility values to assign to the plurality of occupants, wherein the fractional responsibility values collectively comprise the responsibility value, and are based on the transport event and the one or more sub-events, and assigning the determined fractional responsibility values to the plurality of occupants.

Yet another example embodiment may provide a method comprising one or more of determining a fractional responsibility of an event for at least one occupant of a transport, receiving information related to the event, determining an adjusted fractional responsibility based on the received information and the fractional responsibility, and receiving a response from the at least one occupant that satisfies the adjusted fractional responsibility.

Yet a further example embodiment may provide a system comprising a processor and a memory on which are stored machine readable instructions that when executed by the processor, cause the processor to perform one or more of determine a fractional responsibility of an event for at least one occupant of a transport, receive information related to the event, determine an adjusted fractional responsibility based on the received information and the fractional responsibility, and receive a response from the at least one occupant that satisfies the adjusted fractional responsibility.

Yet a further example embodiment may provide a non-transitory computer readable medium comprising instructions, that when read by a processor, cause the processor to perform one or more of determining a fractional responsibility of an event for at least one occupant of a transport, receiving information related to the event, determining an adjusted fractional responsibility based on the received information and the fractional responsibility, and receiving a response from the at least one occupant that satisfies the adjusted fractional responsibility.

DETAILED DESCRIPTION

Figure 1A:
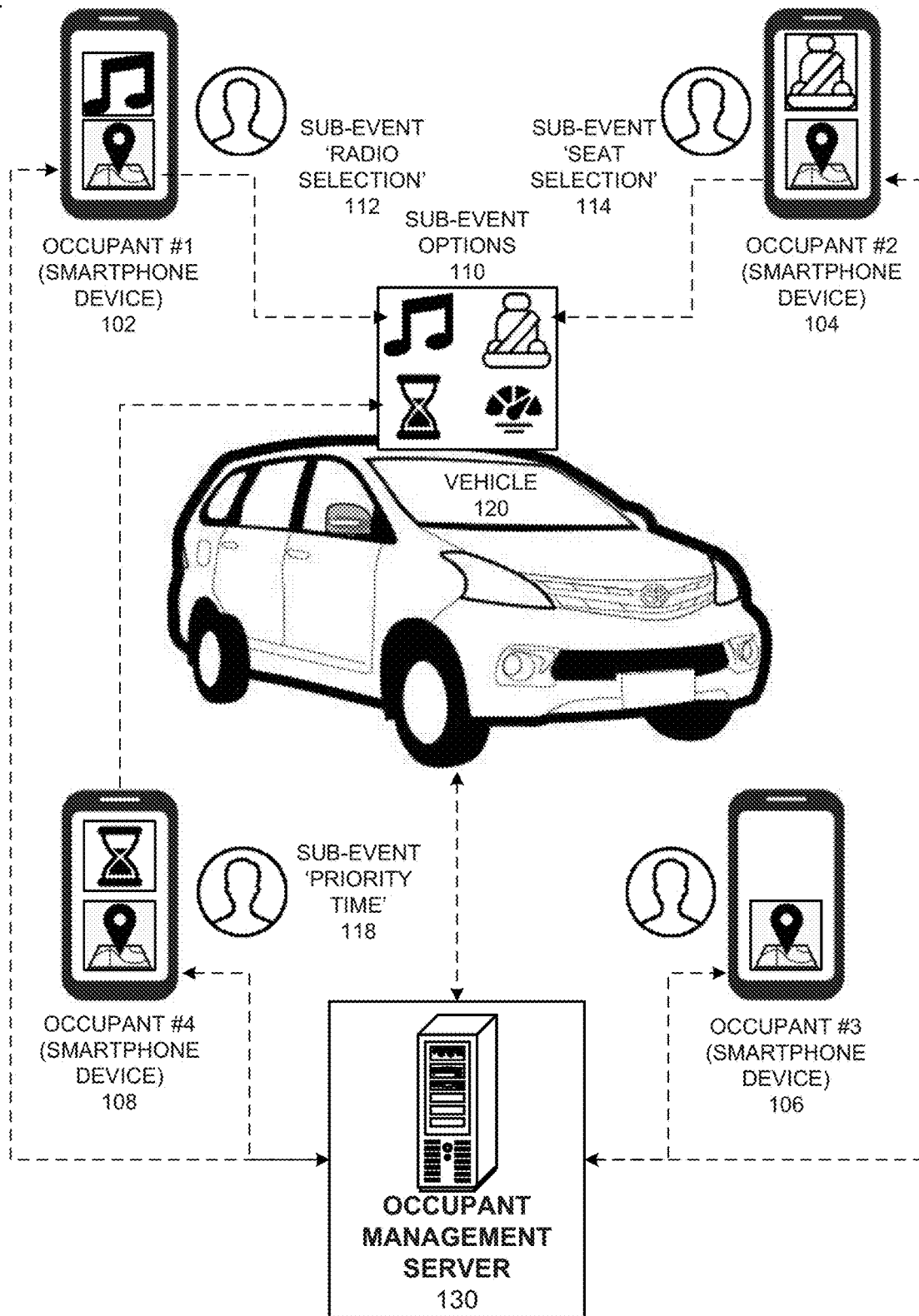
FIG. 1A illustrates a diagram of a transport event management system, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide a transport (also referred to as a vehicle herein) service for occupants. For example, a vehicle may offer an event, such as a trip, taxi service, transportation, etc., and the occupant(s) may select, via a personal device, such as a smartphone or similar computing device, to participate in the vehicle event alone or with other occupants. In operation, the event may include a foundational transportation service to the occupants, such as point 'A' pickup locations and point 'B' drop-off locations. However, the event may include various sub-events which require re-computations, analysis and/or additional consideration regarding the responsibility of the occupants during the event.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permission-less blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The example embodiments of the instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for vehicle events to be controlled by a permission granting entity and thus in a "decentralized" manner, such as via a blockchain membership group. Each interested party (i.e., driver, remote driver, company, agency, occupant, etc.) may want to limit the exposure of private information, and therefore the blockchain and its immutability can limit the exposure and manage permissions for each particular user vehicle profile. A smart contract may be used to provide compensation, permission determination and distribution to entities seeking access to such a vehicle event (or sub-events). Also, if fraud is detected, the necessary information can be shared among the entities based on a "consensus" approach associated with the blockchain. Such an approach could not be implemented on a traditional centralized database. Although, each company has its own independent information system, it is not practical to assume that this blockchain-based approach could be implemented on a centralized system, since the consensus mechanism of the blockchain is used to share information when permission is required.

FIG. 1A illustrates a network diagram of a vehicle event management system, according to example embodiments.

Referring to FIG. 1A, the network 100 includes a vehicle 120 which may be configured with communication services, such as WIFI, cellular and other communication protocols and services, controlled by an on-board computer controller and/or a computer device located inside the vehicle (i.e., smartphone), to receive and transmit information related to an occupant service for upcoming events. In this example, the vehicle 120 may provide various sub-event options in addition to transportation services. For example, an occupant can elect to participate in the additional sub-events 110, such as radio station selection, seat selection, speed/priority of drop-off order, etc. Different transports may offer different sub-events which can be selected by occupants before and/or during the transportation event.

In operation, a ride-sharing event may be conducted based on occupant selections to consolidate a ride and save money. The occupants may each elect to participate in the vehicle ride share event by selecting an option on their personal computing devices 102-108. In this example, the four participating future occupants may be located at four different locations while attempting to access a ride share event. The first occupant may select to participate in the event and also to select a sub-event, such as a radio selection 112. This enables the occupant #1 to hear the radio station of his or her choice while riding in the transport vehicle 120. Another occupant #2 may select to sit in a particular seat by selecting a seat selection 114, such as front seat, back seat, etc. Another occupant #3 may select the ride share option but not any additional sub-events. Lastly, a fourth occupant #4 may select to have the priority option 118 which enables the drop off to occur first while the others are willing to accept the non-prioritized option. The occupant management server 130 may receive all the selections and identify the occupants as potential candidates for the vehicle 120 which is currently operating near all of them.

The initial responsibility values may be setup among the candidate occupants as a relatively even split #1 (¼ responsibility), #2 (¼ responsibility), #3 (¼ responsibility) and #4 (¼ responsibility), assuming each party was picked up at approximately the same time and location and had the same destination. Since certain occupants may be riding in the transport vehicle 120 for longer periods of time, the responsibility values assigned to those occupants will be different than those which are not in the vehicle for as long a period of time. Assuming the occupants were in the vehicle for the same amount of time and for the same distances, then the responsibility values are still adjusted to account for the sub-events selected by the occupants, such as the radio, seat, priority, speed requests, etc. In the event of three equal sub-event selections and one non-sub-event selecting occupant the values may be, for example, #1 (9/32 responsibility), #2 (9/32 responsibility), #3 (9/32 responsibility) and #4 (5/32 responsibility), to achieve a value of 100 percent responsibility divided unequally among the occupants to reflect the sub-events. Other sub-events may also occur, such as tolls, citations and other fee-related sub-events which may or may not be the responsibility of the occupants. A smart contract stored and enabled in the blockchain may dictate the responsibility values for certain sub-event options and inevitable events, such as tolls and citations. The server 130 may receive the occupant selections, identify the profiles and enable the smart contract to begin calculating the values associated with the event and sub-events. Results may be stored on a blockchain in the form of a transaction.

Figure 1B:
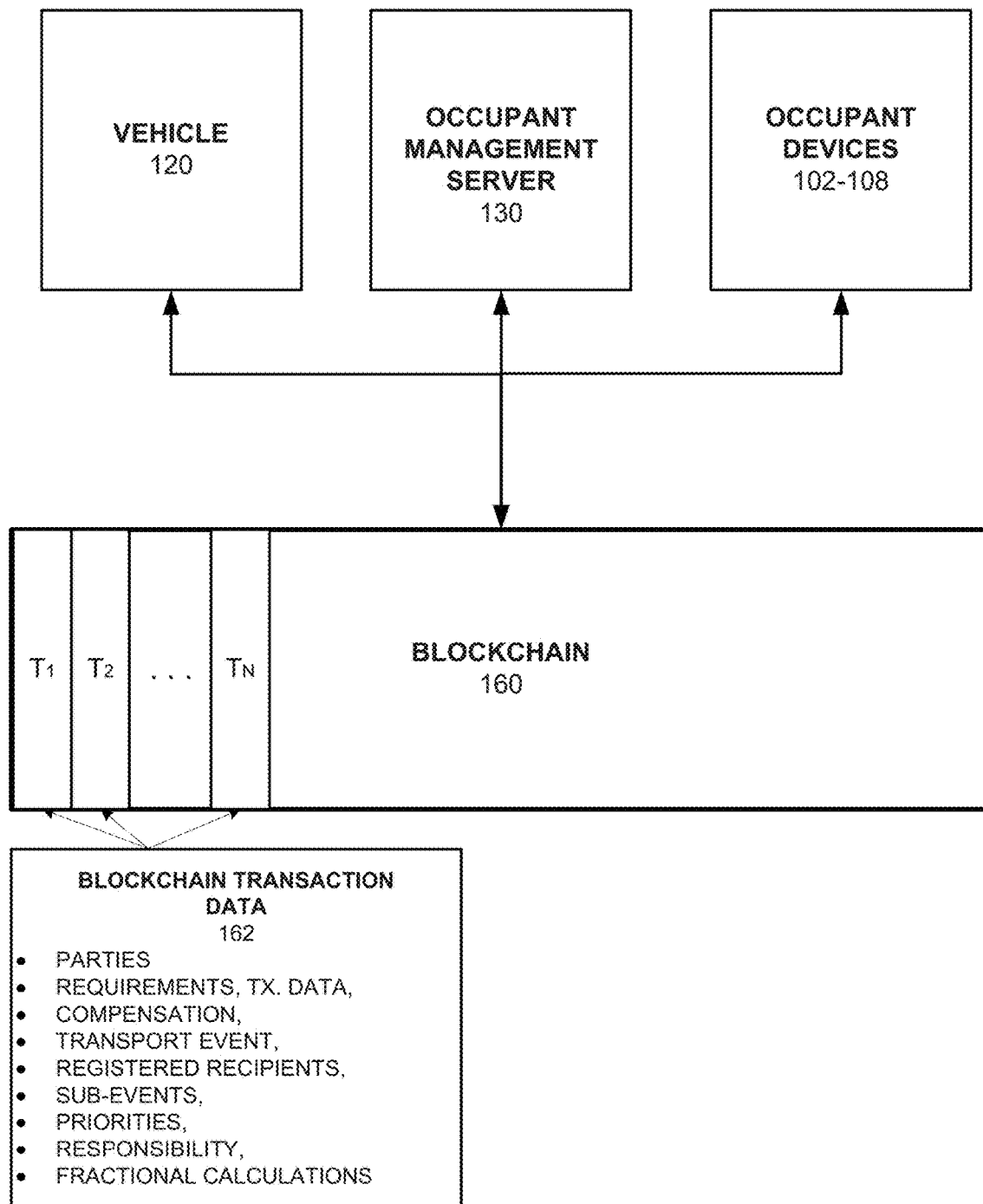
FIG. 1B illustrates a diagram of a transport event data management system utilizing a distributed ledger, according to example embodiments.

FIG. 1B illustrates a diagram of a transport event data management system utilizing a distributed ledger, according to example embodiments. Referring to FIG. 1B, the system 150 includes a vehicle 120, which generates and/or receives vehicle event data and forwards the data to an occupant management server 130, which maintains profiles the vehicles, the vehicle owners, and the occupant and their personal devices 102-108. The blockchain 160 is provided as a member data platform that identifies the ride event data being collected, shared and transferred to third parties and logs the instances of such events via individual blockchain transactions 162. In other embodiments, the data is placed in the blockchain after it has been identified. Content of a transaction may include the parties involved in a transaction, terms, dates, times, types of data, compensation provided, permissions confirmed, vehicle information, such as sub-events and services offered, etc. The shared ledger logs the transferred data in the form of transactions 162 for subsequent audits and other interested parties seeking to identify the transaction validity and confirm the existence of a particular vehicle events.

Figure 1C:
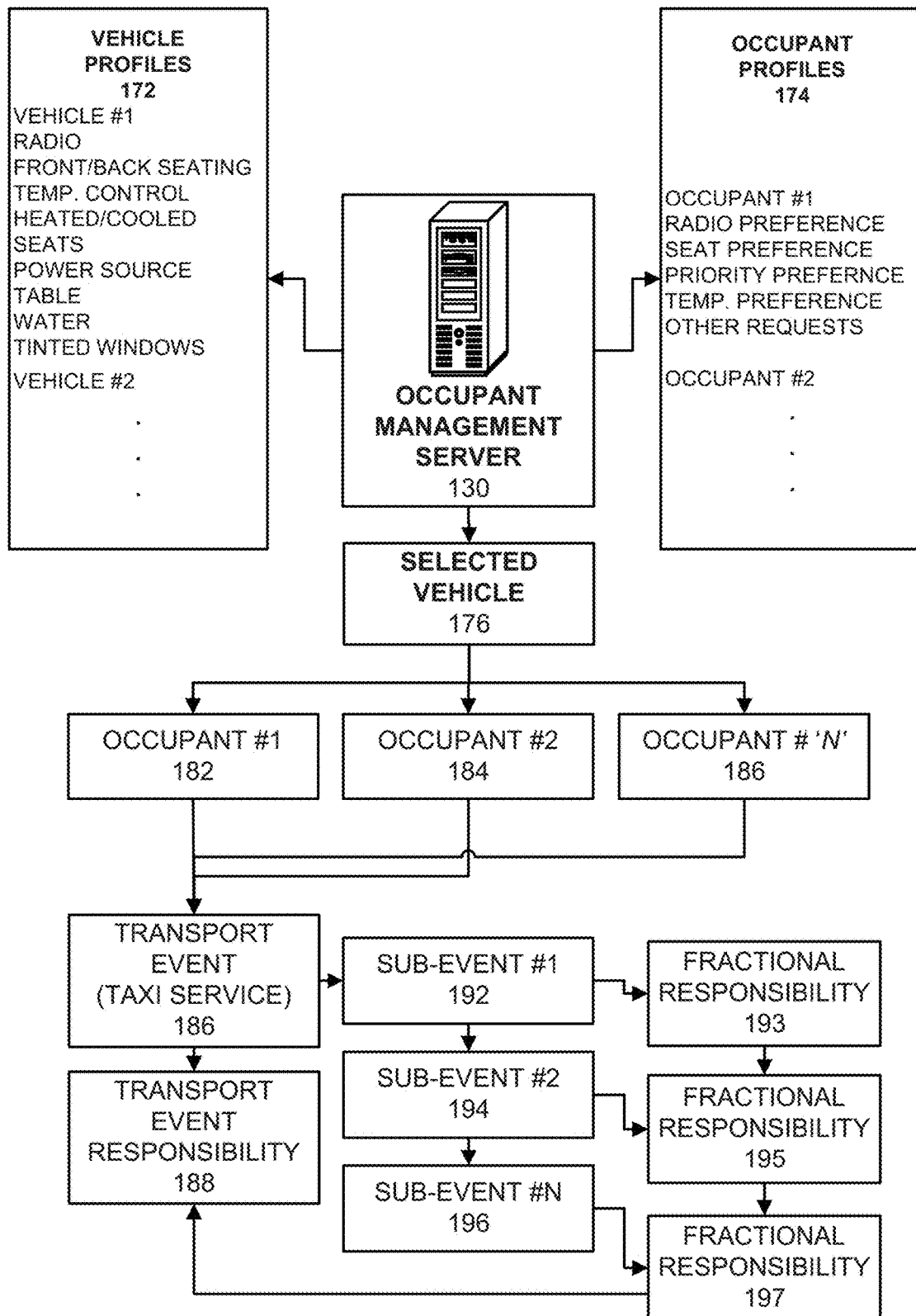
FIG. 1C illustrates a diagram of vehicle event data being processed to identify responsibility values for third parties, according to example embodiments.

FIG. 1C illustrates a diagram of vehicle event data being processed to identify responsibility values for third parties, according to example embodiments. Referring to FIG. 1C, the system 170 includes the occupant management server 130 which stores occupant profiles 174 of registered occupants which are seeking access to certain vehicles participating in a vehicle service. The occupant profiles may identify each occupants' history, preferences, etc. The vehicles are identified by vehicle profiles 172, which may include the sub-event options which are offered as part of a service related to vehicle transportation events. Each vehicle profile may identify different luxuries or services which can be selected by occupants in order to increase values of the vehicle services. In one example, a selected vehicle 176 may be the server selected vehicle to operate during a vehicle event to transport a number of occupants in a ride sharing event. The selected occupants 182, 184 and 186 may include two or more occupants which are agreeing to participate in the vehicle event. The parameters included in the management process may include a particular event type, such as a transportation taxi service 186. The event responsibility 188 may be defined as a particular value pending additional sub-events 192-196 being selected. If no occupant selects to have a sub-event added to the service, then the original responsibility value may not increase unless a different type of sub-event occurs, such as a toll or citation. Each time a sub-event 192-196 is identified, the fractional responsibility value 193 may be modified to increase or adjust the fractional responsibility values for each occupant per each sub-event. For example, the event responsibility 188 may be equal for three occupants assuming they are being picked up and dropped off at the same location. The occupant which selects to have a certain radio station played during the ride may cause a first sub-event 192 to be logged and a corresponding fractional responsibility 193 will be adjusted to increase that occupant's responsibility, which may or may not modify the previous fractional responsibilities of other occupants. For example, some options for sub-events may cause the entire responsibility value to increase so that fractional responsibility values of each occupant will increase or stay the same. Other sub-events may cause the overall responsibility value to stay the same while certain occupants will be responsible for larger responsibility amounts and/or other occupants will be responsible for lesser responsibility amounts. This process may repeat and the fractional responsibility values 193, 195 and 197 may continually increase or decrease depending on the occupant and the new overall event responsibility value.

Figure 2A:
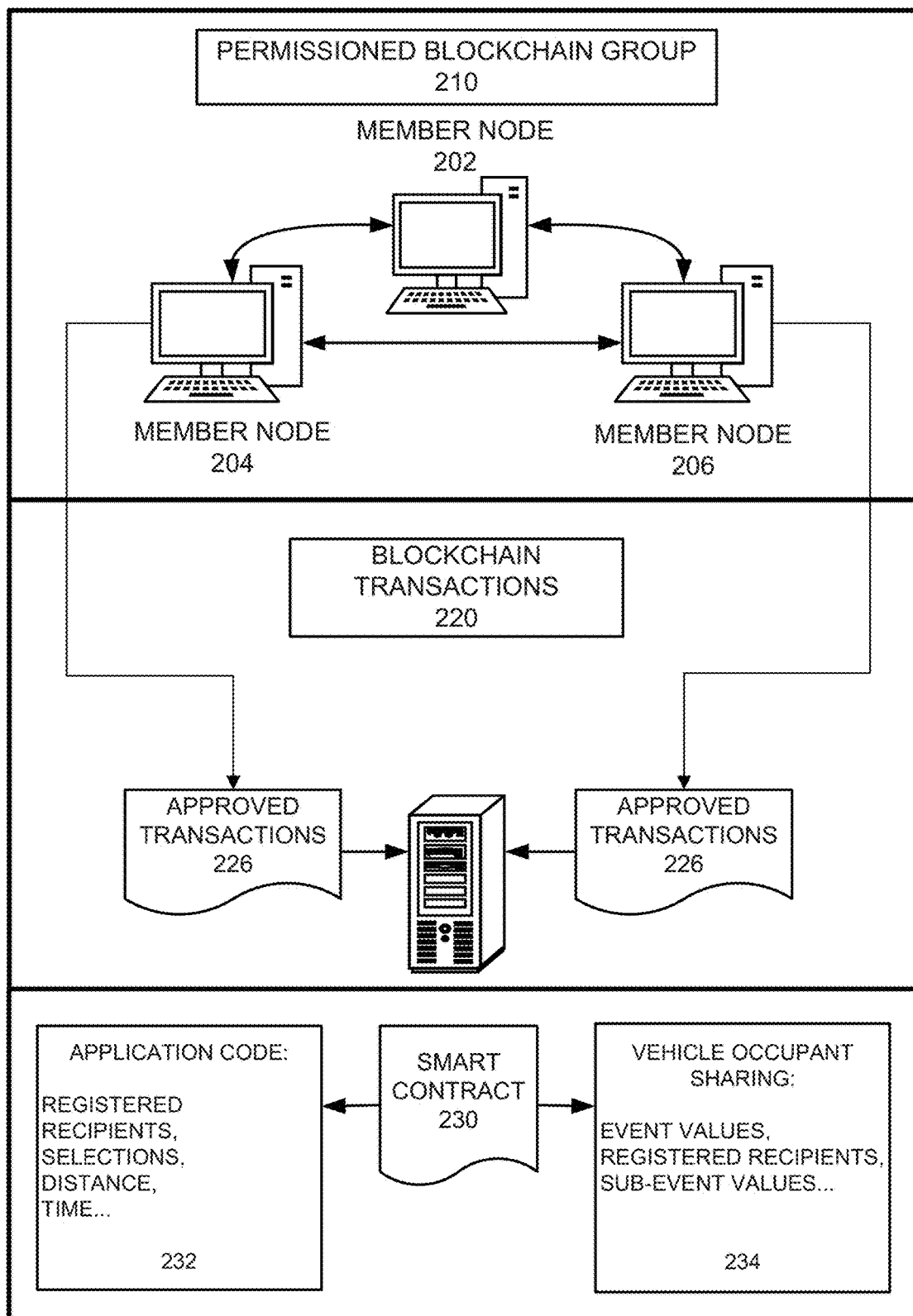
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain member nodes 202-206 as part of a permissioned blockchain group 210. The permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure. In other embodiments, the blockchain group 210 may be a permissionless blockchain group.

The blockchain transactions 220 are stored in memory of computers as the transactions are received and approved by the consensus model dictated by the members' nodes. Approved transactions 226 are stored in current blocks of the blockchain and committed to the blockchain via a committal procedure which includes performing a hash of the data contents of the transactions in a current block and referencing a previous hash of a previous block. Within the blockchain, one or more smart contracts 230 may exist that define the terms of transaction agreements and actions included in smart contract executable application code 232. The code may be configured to identify when sensor data exceeds various thresholds (such as impact, speed, braking, etc.) and other measures. For example, when a collision sensor is triggered, and a vehicle velocity is above a particular threshold prior to the collision, then the action may include providing emergency measures to the transports, the transports near the collision, etc. The vehicle sensor data may be based on vehicle data sharing agreements to include permissions granted to share vehicle sensor data, registered parties to receive the data, and types of sensor data to share, etc., 234.

Figure 2B:
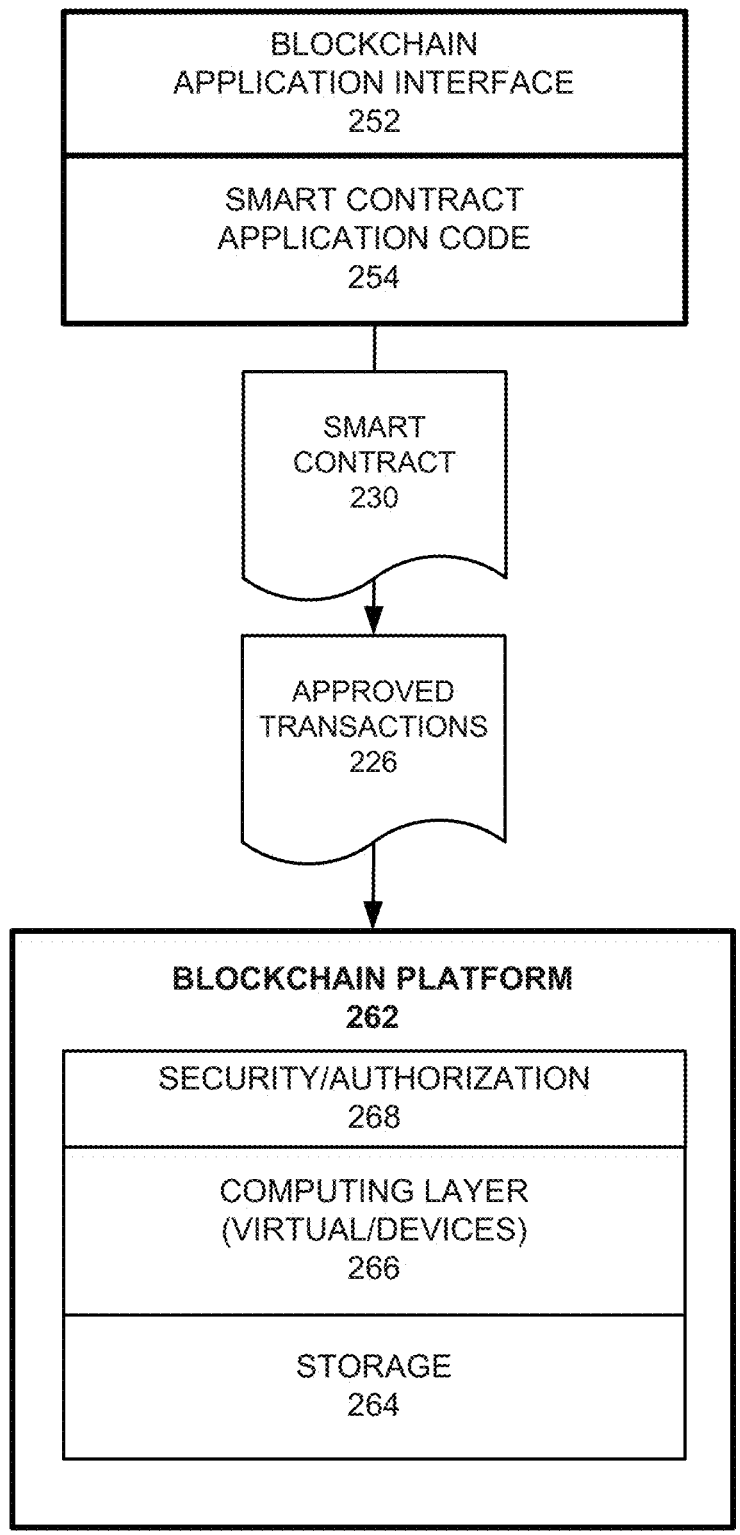
FIG. 2B illustrates a distributed ledger configuration, according to example embodiments.

FIG. 2B illustrates a shared ledger configuration, according to example embodiments. Referring to FIG. 2B, the blockchain logic example 250 includes a blockchain application interface 252 as an API or plug-in application that links to the computing device and execution platform for a particular transaction. The blockchain configuration 250 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 254 provides a basis for the blockchain transactions by establishing application code which when executed causes the transaction terms and conditions to become active. The smart contract 230, when executed, causes certain approved transactions 226 to be generated, which are then forwarded to the blockchain platform 262. The platform includes a security/authorization 268, computing devices which execute the transaction management 266 and a storage portion 264 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 2A and 2B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry claim, which may be processed by one or more processing entities (e.g., processors, virtual machines, etc.) included in the blockchain layer. The result may include a decision to reject or approve the claim based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 3:
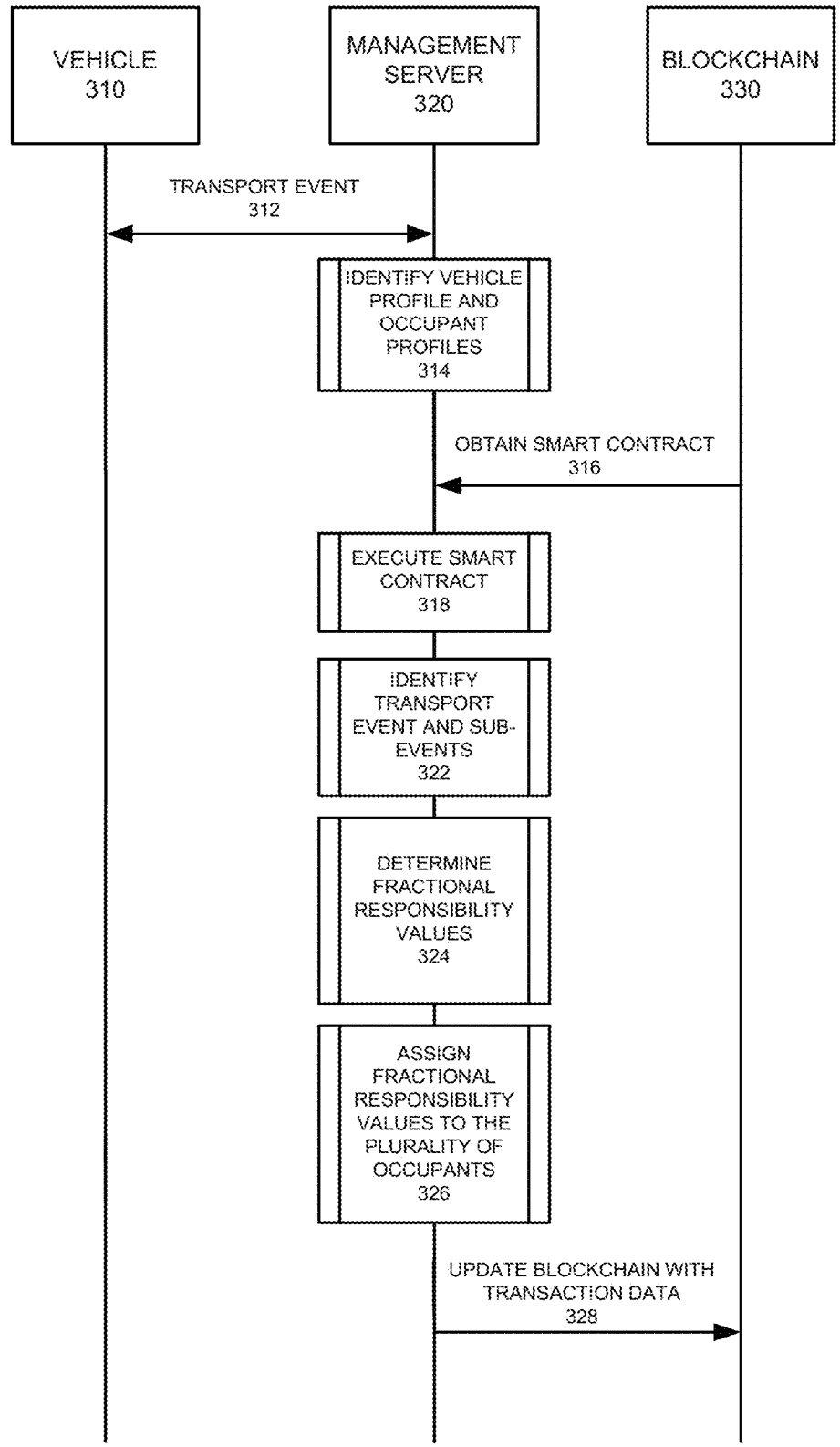
FIG. 3 illustrates a messaging diagram of a transport event management system, according to example embodiments.

FIG. 3 illustrates a messaging diagram of a transport event management system, according to example embodiments. Referring to FIG. 3, the system 300 includes a vehicle 310 which includes a communication device that communicates with a management server 320 to receive transport vehicle event assignments 312. Once a vehicle and upcoming event are identified, the vehicle profile of the vehicle/owner, the occupants which are candidates to participate in the event, etc., are retrieved and identified 314. The agreement and rules of the event may be obtained from a smart contract 316 affiliated with a distributed ledger (blockchain) 330. The smart contract 318 may be used to identify the terms, code, and rules for engaging in the event, such as, options (vehicle options), values (costs), rules (locations, times, dates, etc.). The event is then created and any sub-events which are identified before the event or during the event are also identified 322. The initial responsibility value can be created which can then be adjusted into fractional responsibilities 324 for each occupant depending on their distance traveled, sub-events selected/not selected, etc. Certain fractional responsibility values can then be assigned to each occupant 326 and any updates to those values can be recalculated. Once a final value is identified, a final set of responsibility values are distributed to each occupant profile managed by the server 320. An updated blockchain transaction may be created and committed to a blockchain 330 for record keeping purposes.

Figure 4A:
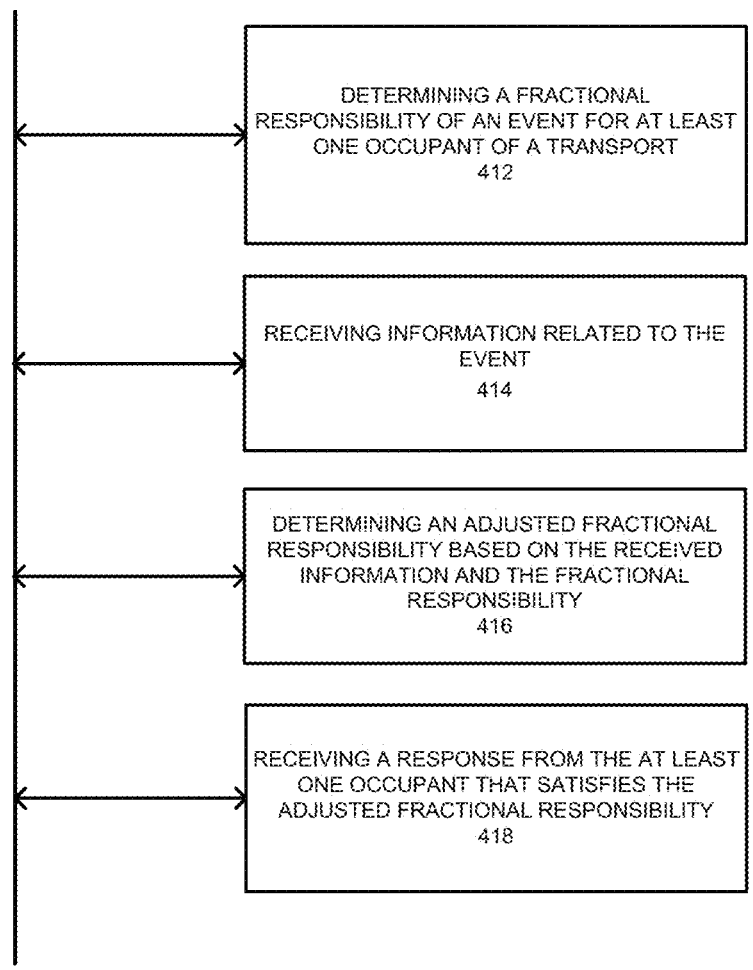
FIG. 4A illustrates a flow diagram of a transport event management process, according to example embodiments.

FIG. 4A illustrates a flow diagram of a transport event management process, according to example embodiments. Referring to FIG. 4A, the example process 400 includes one or more of determining a fractional responsibility of an event for at least one occupant of a transport 412. For example, various occupants may be sharing a transport during a transport transportation event and among those occupants, each occupant is assigned a fractional responsibility of the total responsibility of the event. The process may also include receiving information related to the event 414, for example, the event may include tolls incurred, a traffic violation, certain sub-events which are selected, and which are associated with additional responsibility values, etc. The process may then include determining an adjusted fractional responsibility based on the received information and the fractional responsibility 416, for instance, certain fractional responsibility values which were previously identified are now different due to the occurrence of the event, which may have caused the responsibility value to increase and thus one or more of the fractional responsibility values to also increase. The process may also include receiving a response from the at least one occupant that satisfies the adjusted fractional responsibility 418. For example, one or more of the occupants may have participated in the event via an agreement sent from their smartphone to a server. The final responsibility value is identified and received at the server based on this configuration. The occupant may have to agree or send the response from his or her smartphone.

In another example, the response is received from the at least one occupant before the event or after the event. A smart contract may be stored which identifies the fractional responsibility, the event, an identity of the at least one occupant and/or the response. The smart contract is used, based on at least one of the fractional responsibility, the event, an identity of the at least one occupant and the response. The transport could be a non-autonomous transport, a semi-autonomous transport and a fully autonomous transport. The response may be received from a mobile device associated with the at least one occupant. Also, an outcome of the event, related to a non-vehicle controlling occupant is committed to a transaction of a blockchain of the non-vehicle controlling occupant, such as a blockchain associated with or managed by the non-vehicle controlling occupant.

Another example embodiment may include a system that includes a processor, and a memory on which are stored machine readable instructions that when executed by the processor, cause the processor to determine a fractional responsibility of an event for at least one occupant of a transport, receive information related to the event, determine an adjusted fractional responsibility based on the received information and the fractional responsibility, and receive a response from the at least one occupant that satisfies the adjusted fractional responsibility.

Figure 4B:
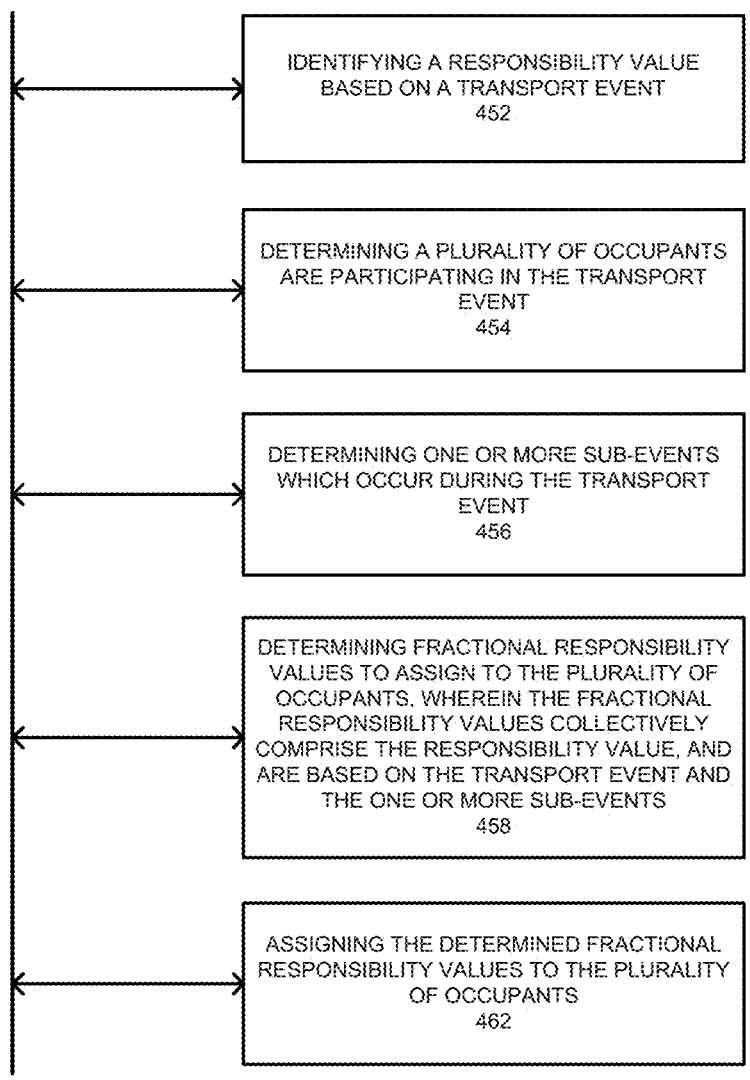
FIG. 4B illustrates another flow diagram of a transport event management process, according to example embodiments.

FIG. 4B illustrates another flow diagram of a transport event management process, according to example embodiments. Referring to FIG. 4B, the example process 450 provides one or more of identifying a responsibility value based on a transport event 452, the value may be a total value estimated for all occupants, an estimated distance traveled, time, etc. The process may also provide determining a plurality of occupants are participating in the transport event 454, determining one or more sub-events which occur during the transport event 456, determining fractional responsibility values to assign to the plurality of occupants, where the fractional responsibility values collectively include the responsibility value, and are based on the transport event and the one or more sub-events 458, for example, the initial responsibility value may be modified based on selected sub-events, which may cause the overall responsibility value to increase or just a fractional responsibility value of one or more occupants which are associated with that particular sub-event. The process may also provide assigning the determined fractional responsibility values to the plurality of occupants 462 according to their respective assignments with the responsibility values, the event, the sub-events, etc. For example, if one particular occupant has selected to receive numerous sub-event benefits and the others have not selected any, then that occupant will have a significantly larger fractional responsibility than the others, even though the occupants all shared a ride together.

In one example, the process may also include determining one or more of the plurality of occupants selected to receive a priority transport sub-event based on one or more of preferences and destinations, and where the priority transport sub-event is one of the one or more sub-events. The priority event could be a priority seating selection, a priority radio station selection, a priority drop-off order that reduces the length of time the priority seeking occupant spends inside the vehicle and/or any other sub-event priority selection. The process may also include determining a weight to apply to the priority transport sub-event and adjusting the determined fractional responsibility values based on the determined weight applied to the priority transport sub-event. The adjustment may include various modifications to all occupant fractional responsibilities calculated and distributed to the occupant profiles. The process may also include initiating a smart contract which identifies the one or more sub-events and corresponding weighted values assigned to the one or more of sub-events and determining which of the one or more sub-events were invoked during the transport event by identifying a sub-event log updated during the transport event. Also, the process may include storing the fractional responsibility values, a satisfied responsibility value, profiles associated with the one or more of the plurality of occupants, and a date and time associated with the transport event, in a distributed ledger transaction, and storing the distributed ledger transaction in a blockchain. When assigning the determined fractional responsibility values to the plurality of occupants, the process may also provide transmitting the fractional responsibility values to the profiles associated with the one or more of the plurality of occupants. The process may also include receiving confirmation notifications confirming the fractional responsibility values, and responsive to receiving the confirmation notifications, storing a satisfied responsibility value confirming the responsibility value was satisfied in a distributed ledger transaction. The process may also include determining initial fractional responsibility values to assign to the plurality of occupants, and responsive to determining one or more of the plurality of occupants has selected one or more of the sub-events during the transport event, reallocating the initial fractional responsibility values into the fractional responsibility values. The reallocating of the initial fractional responsibility values increases a value of the fractional responsibility values of the one or more occupants which selected the one or more sub-events.

Another example embodiment may include a transport and a server configured to perform one or more of identify a responsibility value based on a transport event of the transport, determine a plurality of occupants are participating in the transport event, determine one or more sub-events which occur during the transport event, determine fractional responsibility values to assign to the plurality of occupants, and where the fractional responsibility values collectively include the responsibility value, and are based on the transport event and the one or more sub-events, and assign the determined fractional responsibility values to the plurality of occupants. The system may also include the server being configured to determine one or more of the plurality of occupants selected to receive a priority transport sub-event based on one or more of preferences and destinations, where the priority transport sub-event is one of the one or more sub-events, determine a weight to apply to the priority transport sub-event, and adjust the determined fractional responsibility values based on the determined weight applied to the priority transport sub-event.

Figure 4C:
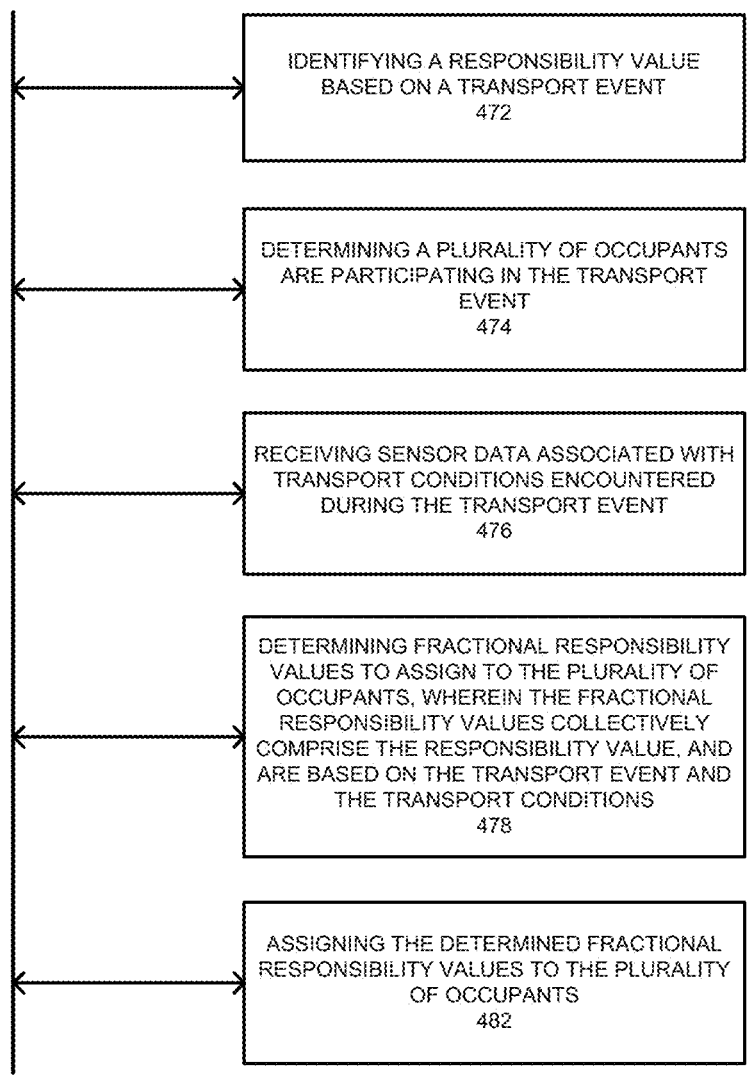
FIG. 4C illustrates a further flow diagram of a transport event management process, according to example embodiments.

FIG. 4C illustrates another flow diagram of a transport event management process, according to example embodiments. Referring to FIG. 4C, in this example, the process 470 includes one or more of identifying a responsibility value based on a transport event 472, the value may be a total value estimated for all occupants, an estimated distance traveled, time, etc. The process may also provide determining a plurality of occupants are participating in the transport event 474 and receiving sensor data associated with transport conditions encountered during the transport event 476. The sensor data may include data received from any of various sensors inside and in communication with the transport.

The sensor content and different sensor data types may include one or more of a radio station selection, recorded audio, mobile device usage within the vehicle, telephone calls conducted inside the vehicle, browser history of at least one of the computing devices, purchases conducted via at least one computing device inside the vehicle, movement of the vehicle, navigation of the vehicle, a collision of the vehicle, speed of the transport, acceleration of the vehicle, diagnostics associated with the transport including battery charge level, gasoline level, oil level, temperature of the vehicle, location of the vehicle, detected traffic near the vehicle, information regarding other vehicles, etc..

The types of sensors include one or more of movement sensors, sonar sensors, lidar sensors, accelerometers, touch sensors, proximity sensors, temperature sensors, speed sensors, sound sensors, infrared sensors, collision sensors, level sensors, tire pressure sensors, location determination sensors, ultrasonic sensors, camera sensors, activity sensors, chemical sensors, fluid sensors, pressure sensors, optical sensors and biometric sensors, and the like.

The process may also include one or more determining fractional responsibility values to assign to the plurality of occupants, where the fractional responsibility values collectively include the responsibility value, and are based on the transport event and the transport conditions 478, for example, the initial responsibility value may be modified based on selected sub-events, which may cause the overall responsibility value to increase or just a fractional responsibility value of one or more occupants which are associated with that particular transport condition. For example, if the transport undergoes extensive harsh road conditions, the responsibility value of the event may be increased to have the occupants be responsible for the extra intensive sensed road conditions experienced by the vehicle, as identified by the sensors. The process may also provide assigning the determined fractional responsibility values to the plurality of occupants 482 according to their respective assignments with the responsibility values, the event, the sub-events, etc. For example, if one particular occupant has selected to receive numerous sub-event benefits and the others have not selected any, then that occupant will have a significantly larger fractional responsibility than the others, even though the occupants all shared a ride together.

Figure 5A:
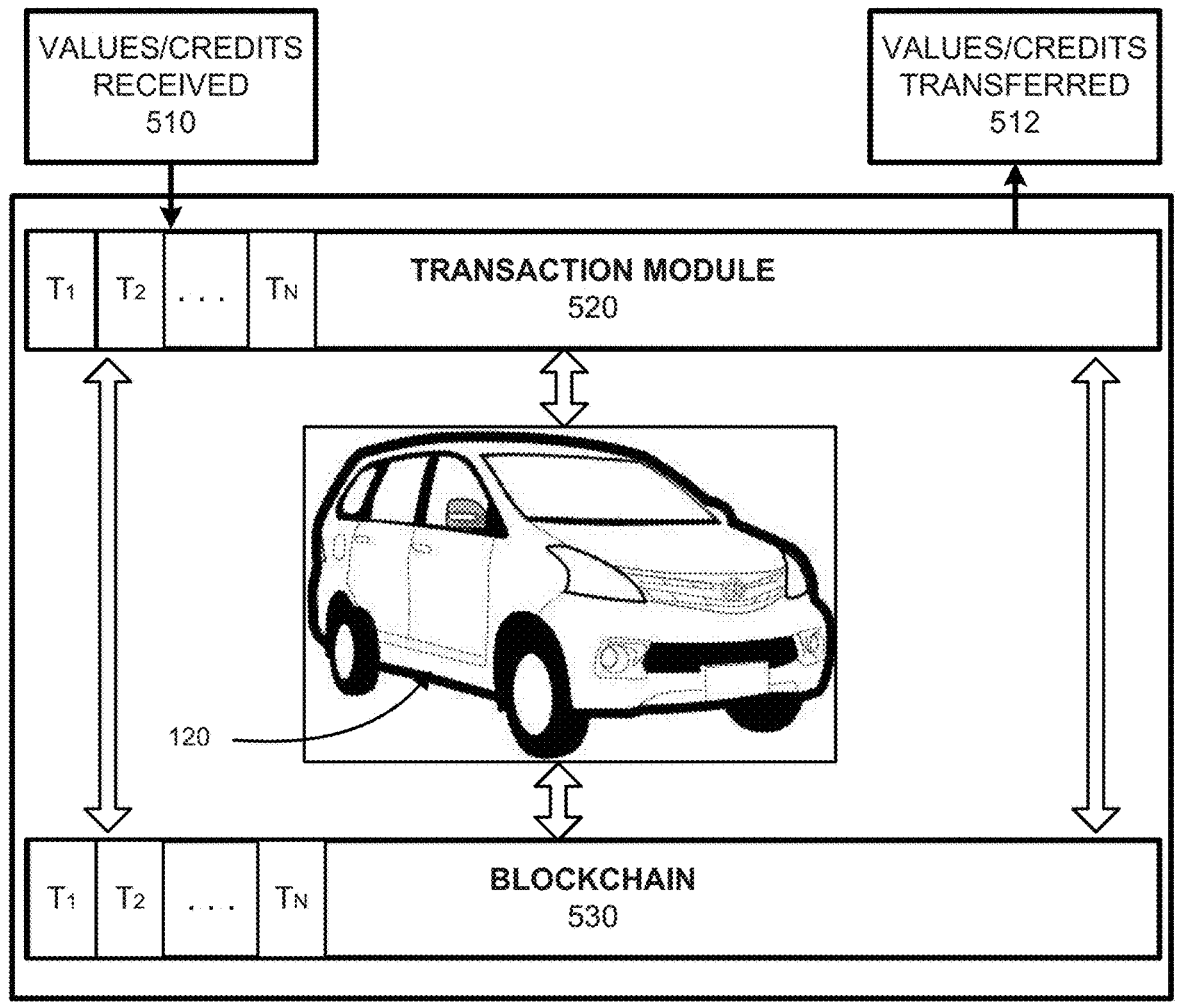
FIG. 5A illustrates an example blockchain transport configuration, according to example embodiments.

FIG. 5A illustrates an example blockchain vehicle configuration 500 for managing blockchain transactions associated with a vehicle, according to example embodiments. Referring to FIG. 5A, as a particular transport/vehicle 120 is engaged in transactions, such as service transactions (e.g., vehicle service, dealer transactions, delivery/pickup, transportation services, etc.), the vehicle may receive values 510 and/or expel/transfer values 512 according to a service transaction(s). The transaction module 520 may record information, such as parties, credits, service descriptions, date, time, location, results, notifications, unexpected events, etc. Those transactions in the transaction module 520 may be replicated into a blockchain 530 which is managed by a remote server and/or remote blockchain peers, among which the vehicle itself may represent a blockchain member and/or blockchain peer. In other embodiments, the blockchain 530 resides on the vehicle 120. Responsibility for value/credits received and/or transferred can be fractionally assigned as described herein.

Figure 5B:
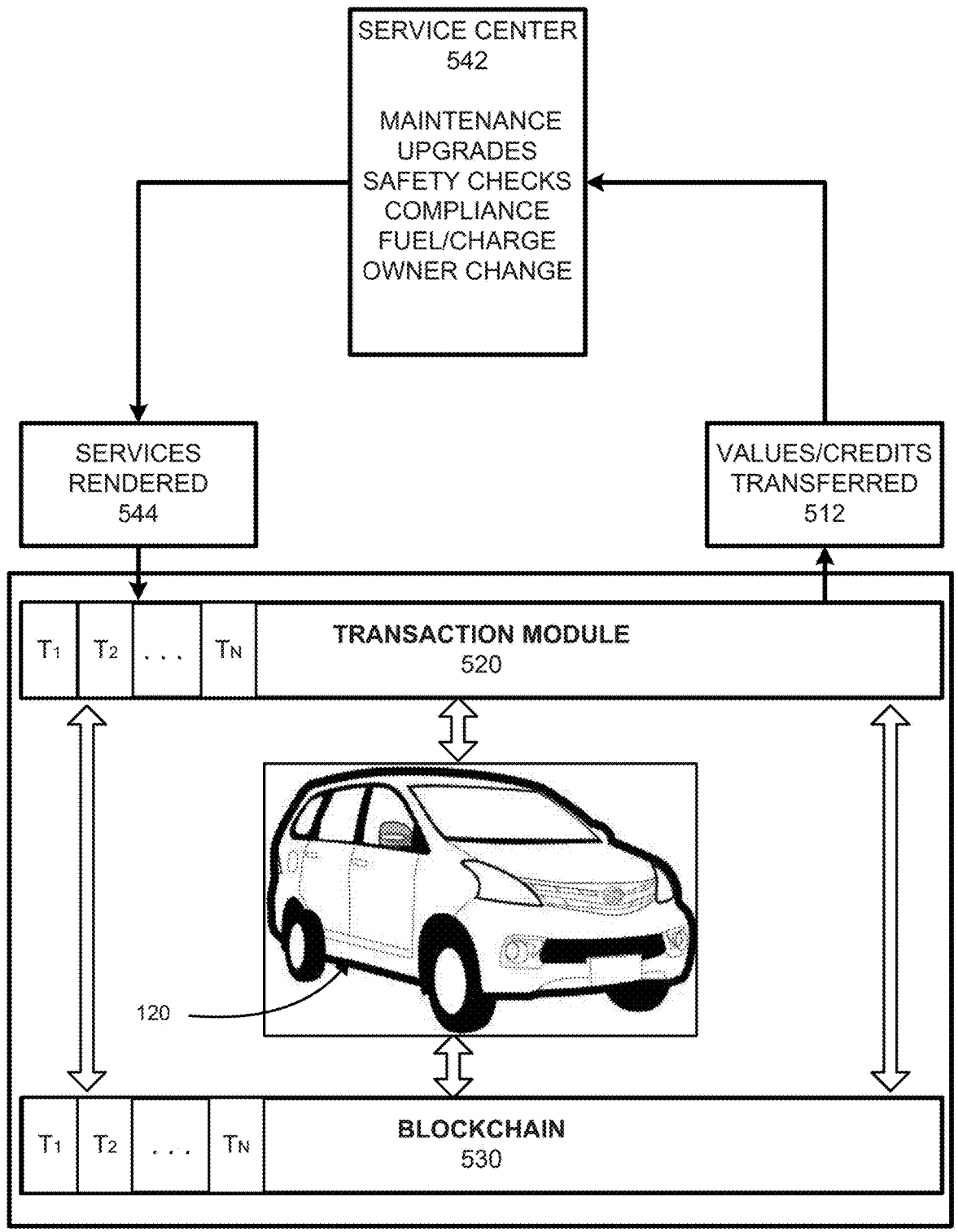
FIG. 5B illustrates another example blockchain transport configuration, according to example embodiments.

FIG. 5B illustrates an example blockchain vehicle configuration 540 for managing blockchain transactions between a service center and a vehicle, according to example embodiments. In this example, the vehicle 120 may have driven itself to a service center 542 (e.g., automotive dealer, local service stop, delivery pickup center, etc.) because the vehicle needs service and/or needs to stop at a particular location. The service center 542 may register the vehicle for a service call at a particular time, with a particular strategy, such as oil change, battery charge or replacement, tire change or replacement, and any other transport related service. The services rendered 544 may be performed based on a smart contract which is downloaded from or accessed via the blockchain 530 and identified for permission to perform such services for a particular rate of exchange. The services are logged in the transaction log of the transaction module 520, the credits 512 are transferred to the service center 542 and the blockchain may log transactions to represent all the information regarding the recent service. In other embodiments, the blockchain 530 resides on the vehicle 120 and/or the service center 542. In one example, a transport event may require a refuel or other vehicle service and the occupants may then be responsible for the responsibility value increase for such service. The service may be rendered via a blockchain notification which is then used to redistribute the responsibility value to the occupants via their respective fractional responsibility values. Responsibility for the service center activities can be fractionally assigned as described herein.

Figure 5C:
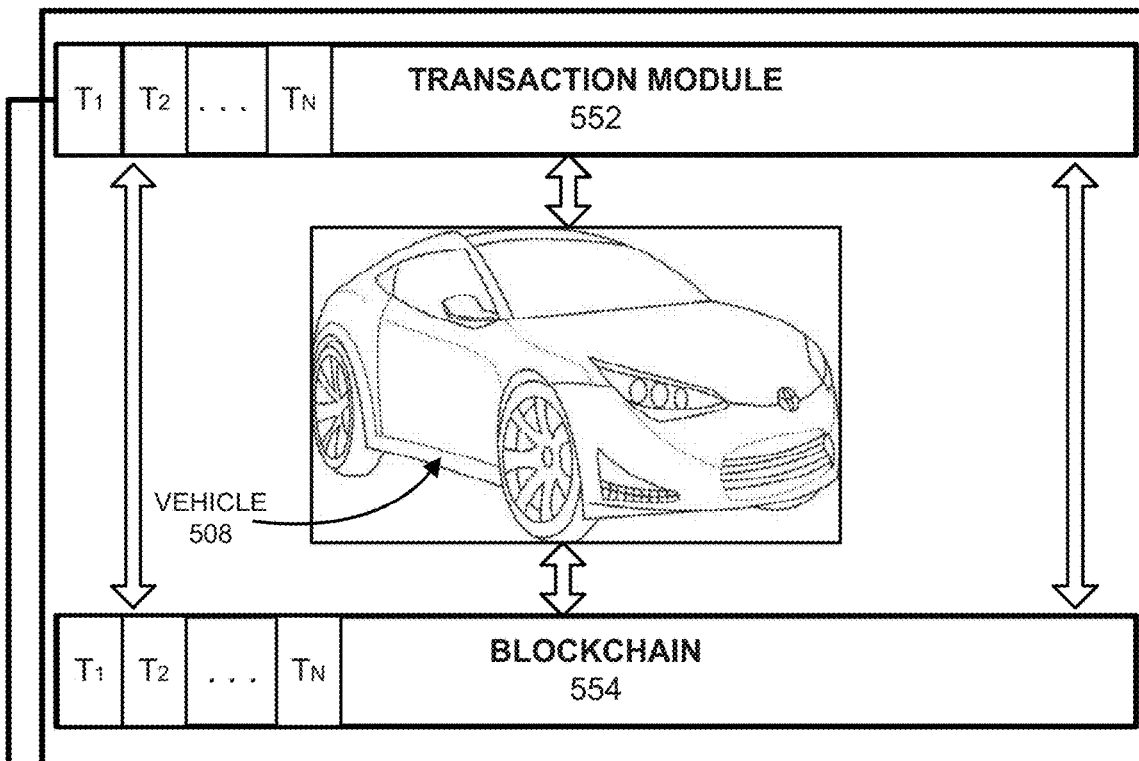
FIG. 5C illustrates a further example blockchain transport configuration, according to example embodiments.
Figure 5C:
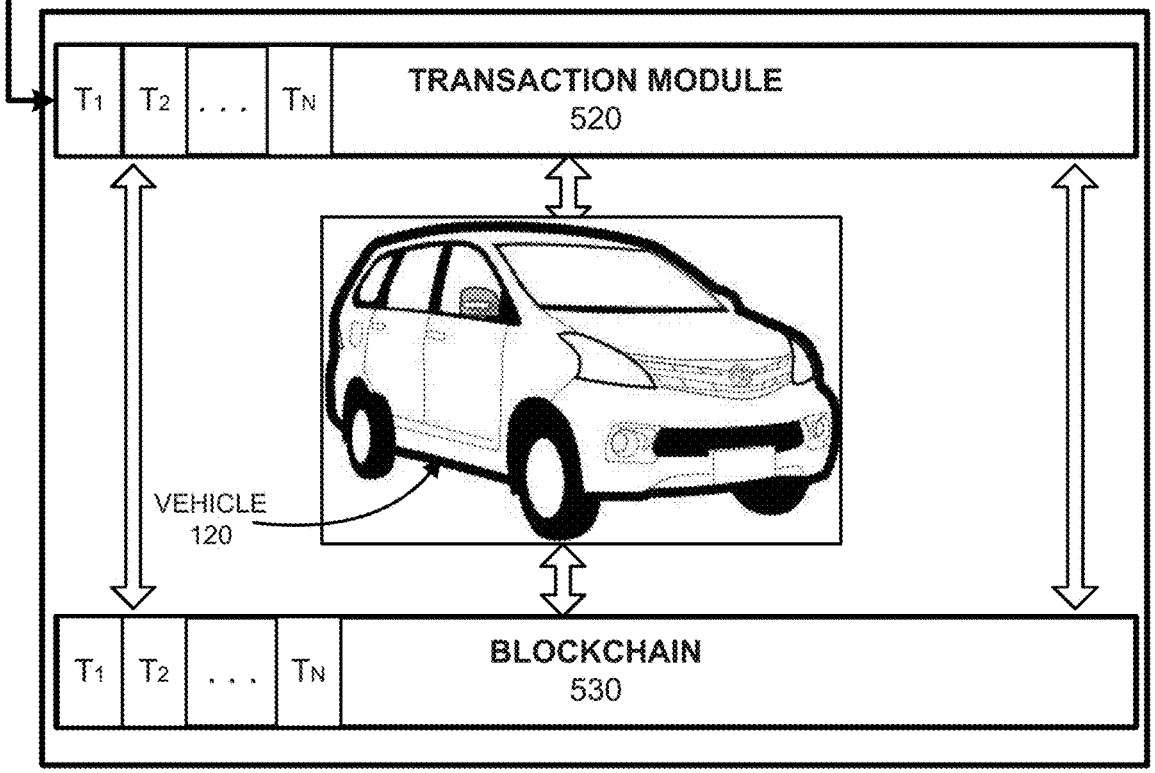

FIG. 5C illustrates an example blockchain vehicle configuration for managing blockchain transactions conducted among various vehicles, according to example embodiments. The vehicle 120 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. The vehicle 508 may notify another vehicle 120 which is in its network and which operates on its blockchain member service. The vehicle 120 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 120 and the record of the transferred service is logged in the blockchain 530/554 assuming that the blockchains are different from one another, or, are logged in the same blockchain used by all members. Responsibility for the transferred credits can be fractionally assigned as described herein.

In another embodiment, the fractional responsibility of a user for the duration of a rental period of a transport is stored in a blockchain. An execution of a smart contract associated with the user determines the associated fractional responsibility pertaining to the cost of the transport, the cost of the insurance related to the transport, and any subsequent costs associated with fees incurred during the use of the transport, such as tolls and citations.

In another embodiment, the fractional responsibility for any occupant of the transport is stored on a blockchain. The execution of a smart contract associated with the respective occupants determine the fractional responsibility for each use of the transport.

Figure 6:
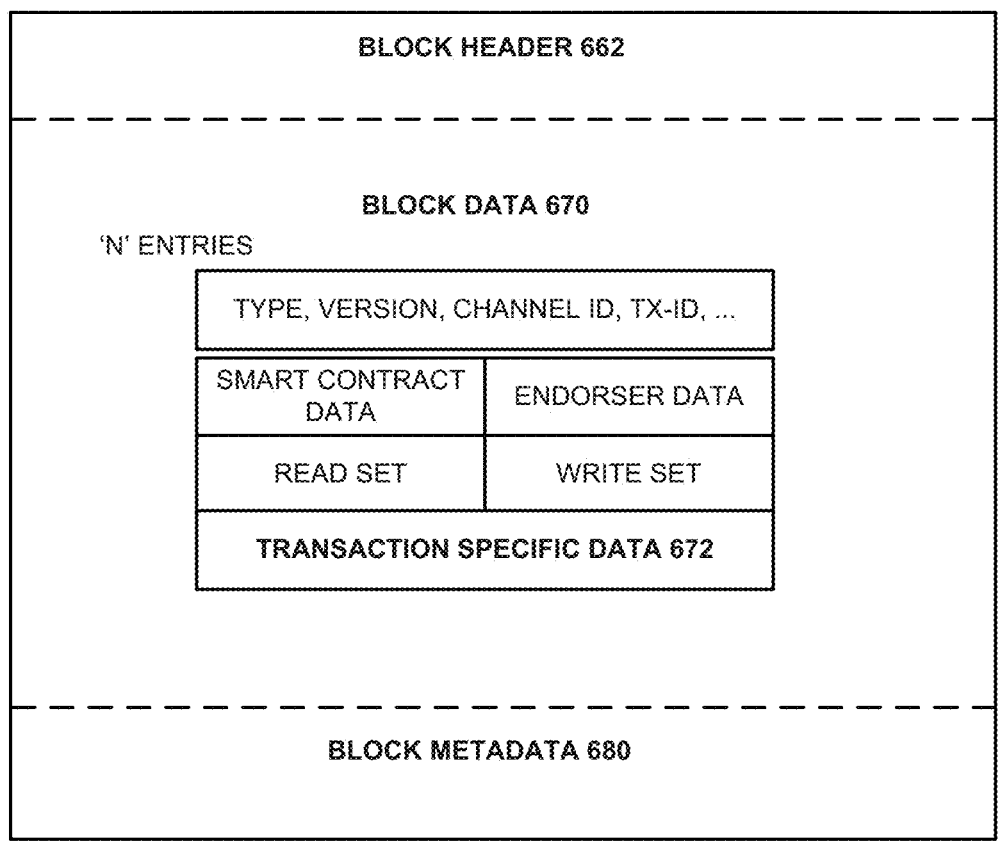
FIG. 6 illustrates an example data block, according to example embodiments.

Referring to FIG. 6, a block 660 (also referred to as a data block) that is stored on the blockchain and/or the distributed ledger may include multiple data segments such as a block header 662, transaction specific data 672, and block metadata 680. It should be appreciated that the various depicted blocks and their contents, such as block 660 and its contents are merely for purposes of an example and are not meant to limit the scope of the example embodiments. In some cases, both the block header 662 and the block metadata 680 may be smaller than the transaction specific data 672 which stores entry data, however this is not a requirement. The block 660 may store transactional information of N entries (e.g., 100, 500, 1000, 2000, 3000, etc.) within the block data 670. The block 660 may also include a link to a previous block (e.g., on the blockchain) within the block header 662. In particular, the block header 662 may include a hash of a previous block's header. The block header 662 may also include a unique block number, a hash of the block data 670 of the current block 660, and the like. The block number of the block 660 may be unique and assigned in an incremental/sequential order starting from zero. The first block in the blockchain may be referred to as a genesis block which includes information about the blockchain, its members, the data stored therein, etc.

The block data 670 may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 670 may also store transaction specific data 672 which adds additional information to the hash-linked chain of blocks in the blockchain. Accordingly, the data 672 can be stored in an immutable log of blocks on the distributed ledger. Some of the benefits of storing such data 672 are reflected in the various embodiments disclosed and depicted herein. The block metadata 680 may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 670 and a validation code identifying whether an entry was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
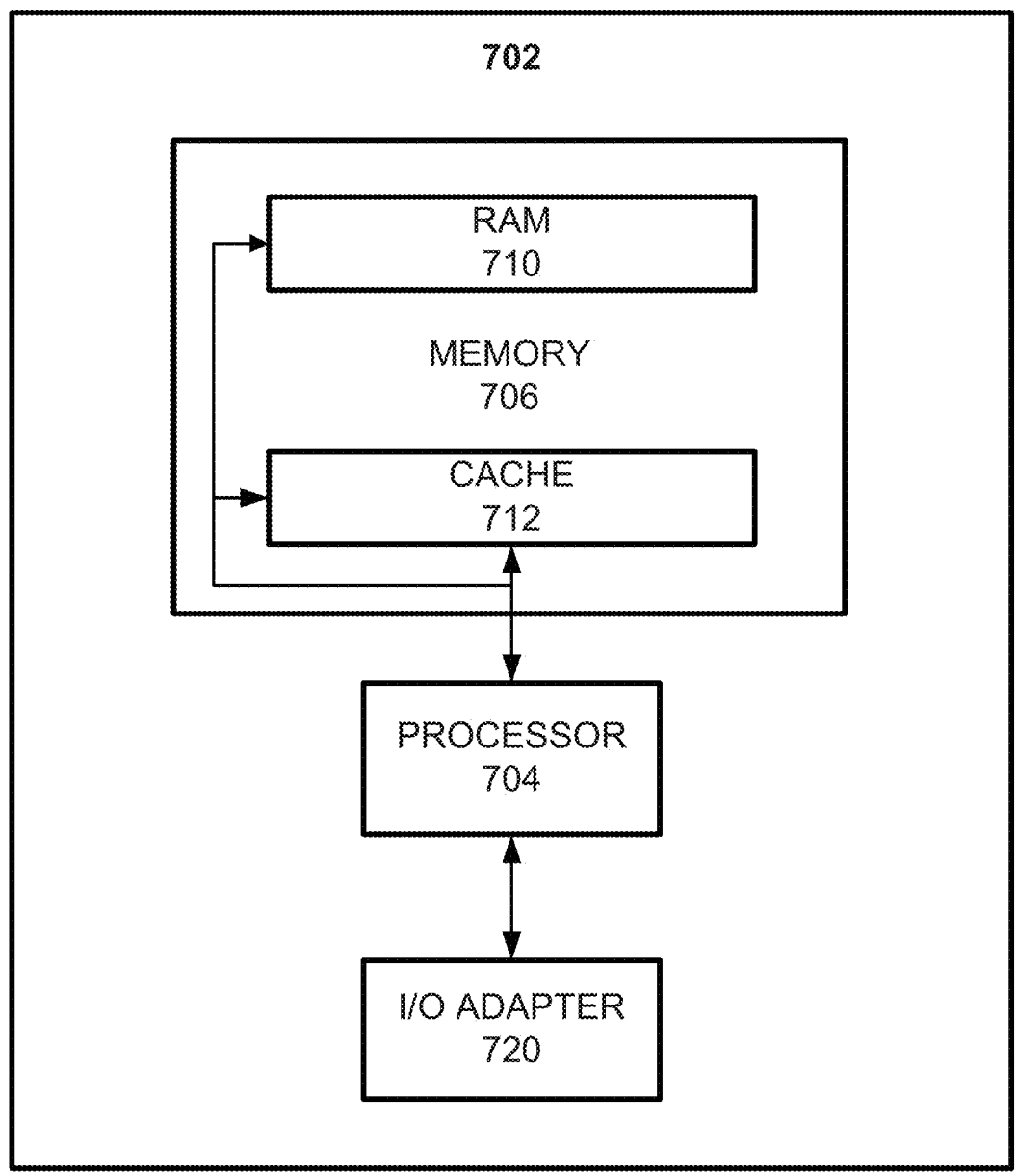
FIG. 7 illustrates an example system that can be used with one or more of the example embodiments.

FIG. 7 is not intended to suggest any limitation as to the scope of use or functionality of embodiments of the application described herein. Regardless, the computing node 800 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via a I/O adapter 720, such as a keyboard, a pointing device, a display, etc.; one or more devices that enable a user to interact with computer system/server 702; and/or any devices (e.g., network card, modem, etc.) that enable computer system/server 702 to communicate with one or more other computing devices. Such communication can occur via I/O interfaces of the adapter 720. Still yet, computer system/server 702 can communicate with one or more networks such as a local area network (LAN), a general wide area network (WAN), and/or a public network (e.g., the Internet) via network adapter. As depicted, adapter 720 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
determining a plurality of initial responsibility values of a plurality of occupants that are participating in a ridesharing event of a transport based on inputs submitted through a plurality of devices of the plurality of occupants, respectively;
receiving an input selection via a system within the transport while the plurality of occupants are participating in the ridesharing event;
determining a first sub-event associated with a first occupant has occurred in the transport based on the input selection received via the system within the transport during the ridesharing event;
identifying a rule associated with the first sub-event on a blockchain ledger of the transport via a blockchain smart contract installed on the blockchain ledger;
modifying each of the plurality of initial responsibility values of the plurality of occupants based on the identified rule of the first sub-event to generate modified fractional responsibility values for each of the plurality of occupants that are participating in the ridesharing event;
generating a blockchain transaction that identifies a date of the first sub-event, a time of the first sub-event, and the modified fractional responsibility values, and committing the blockchain transaction to the blockchain ledger of the transport; and
sending the modified fractional responsibility values to the plurality of occupants.

2. The method of claim 1, wherein the method comprises:
determining a priority transport sub-event associated with the first occupant based on one or more of preferences and destinations;
determining a weight to apply to the priority transport sub-event; and
assigning a fractional responsibility value to the first occupant based on the determined weight applied to the priority transport sub-event.

3. The method of claim 1, further comprising:
initiating the blockchain smart contract which identifies the first sub-event; and
determining that the first sub-event was invoked based on a sub-event log updated during the ridesharing event.

4. The method of claim 1, further comprising:
storing a satisfied responsibility value and profiles associated with the plurality of occupants on the blockchain ledger.

5. The method of claim 1, wherein the method further comprises storing a plurality of different fractional responsibility values within profiles associated with the plurality of occupants.

6. The method of claim 5, further comprising:
receiving confirmation notifications confirming the different fractional responsibility values.

7. The method of claim 6, further comprising:
responsive to receiving the confirmation notifications, storing satisfied responsibility values confirming the different fractional responsibility values were satisfied via the blockchain ledger.

8. A system, comprising:
a processor configured to:
determine a plurality of initial responsibility values of a plurality of occupants that participate in a ridesharing event of a transport based on inputs submitted through a plurality of devices of the plurality of occupants, respectively;
receive an input selection via a system within the transport while the plurality of occupants participate in the ridesharing event;
determine a first sub-event associated with a first occupant has occurred in the transport based on the input selection received via the system within the transport during the ridesharing event;
identify a rule associated with the first sub-event on a blockchain ledger of the transport via a blockchain smart contract installed on the blockchain ledger;
modify each of the plurality of initial responsibility values of the plurality of occupants based on the identified rule of the first sub-event to generate modified fractional responsibility values for each of the plurality of occupants that participate in the ridesharing event;
generate a blockchain transaction that identifies a date of the first sub-event, a time of the first sub-event, and the modified fractional responsibility values, and commit the blockchain transaction to the blockchain ledger of the transport; and
send the modified fractional responsibility values to the plurality of occupants.

9. The system of claim 8, wherein the processor is configured to
determine a priority transport sub-event associated with the first occupant based on one or more of preferences and destinations;
determine a weight to apply to the priority transport sub-event; and
assign a fractional responsibility value to the first occupant based on the determined weight applied to the priority transport sub-event.

10. The system of claim 8, wherein the processor is further configured to
initiate the blockchain smart contract which identifies the first sub-event; and
determine that the first sub-event was invoked based on a sub-event log updated during the ridesharing event.

11. The system of claim 8, wherein the processor is further configured to
store a satisfied responsibility value and profiles associated with the plurality of occupants on the blockchain ledger.

12. The system of claim 8, wherein the processor is further configured to store the different fractional responsibility values within profiles associated with the plurality of occupants.

13. The system of claim 12, wherein the processor is further configured to
receive confirmation notifications that confirm the different fractional responsibility values.

14. The system of claim 12, wherein the processor is further configured to
responsive to receipt of the confirmation notifications, store satisfied responsibility values that confirm the different fractional responsibility values were satisfied via the blockchain ledger.

15. A non-transitory computer readable medium comprising instructions, that when read by a processor, cause the processor to perform:
determining a plurality of initial responsibility values of a plurality of occupants that are participating in a ridesharing event of a transport based on inputs submitted through a plurality of devices of the plurality of occupants, respectively;
receiving an input selection via a system within the transport while the plurality of occupants are participating in the ridesharing event;
determining a first sub-event associated with a first occupant has occurred in the transport based on the input selection received via the system within the transport during the ridesharing event;
identifying a rule associated with the first sub-event on a blockchain ledger of the transport via a blockchain smart contract installed on the blockchain ledger;
modifying each of the plurality of initial responsibility values of the plurality of occupants based on the identified rule of the first sub-event to generate modified fractional responsibility values for each of the plurality of occupants that are participating in the ridesharing event;
generating a blockchain transaction that identifies a date of the first sub-event, a time of the first sub-event, and the modified fractional responsibility values, and committing the blockchain transaction to the blockchain ledger of the transport; and
sending the modified fractional responsibility values to the plurality of occupants.

16. The non-transitory computer readable medium of claim 15, wherein the processor is further configured to perform:
determining a priority transport sub-event associated with the first occupant based on one or more of preferences and destinations;
determining a weight to apply to the priority transport sub-event; and
assigning a fractional responsibility value to the first occupant based on the determined weight applied to the priority transport sub-event.

17. The non-transitory computer readable medium of claim 15, wherein the processor is further configured to perform:
initiating the blockchain smart contract which identifies the first sub-event; and
determining that the first sub-event was invoked during the ridesharing event based on a sub-event log updated during the ridesharing event.

18. The non-transitory computer readable medium of claim 17, wherein the processor is further configured to perform:
storing a satisfied responsibility value and profiles associated with the plurality of occupants on the blockchain ledger.

19. The non-transitory computer readable medium of claim 15, wherein the processor is further configured to perform storing a plurality of different fractional responsibility values within profiles associated with the plurality of occupants.

20. The non-transitory computer readable medium of claim 19, further comprising:
receiving confirmation notifications confirming the different fractional responsibility values; and
responsive to receiving the confirmation notifications, storing satisfied responsibility values confirming the different fractional responsibility values were satisfied via the blockchain ledger.

* * * * *